Sept. 20, 1971  H. T. FREEMAN, JR., ET AL  3,606,195

MOLDED PLASTIC SPOOL

Filed Feb. 7, 1969  2 Sheets-Sheet 1

INVENTORS
HOVEY T. FREEMAN, JR.
WILLIAM B. SCHLEGEL

BY

*Barlow & Barlow*
ATTORNEYS

INVENTORS
HOVEY T. FREEMAN, JR.
WILLIAM B. SCHLEGEL
BY
*Barlow & Barlow*
ATTORNEYS

United States Patent Office 3,606,195
Patented Sept. 20, 1971

3,606,195
MOLDED PLASTIC SPOOL
Hovey T. Freeman, Jr., Guaynabo, Puerto Rico, and William B. Schlegel, Cranbury, N.J., assignors to Durafoam, Inc.
Filed Feb. 7, 1969, Ser. No. 797,424
Int. Cl. B65h 75/14
U.S. Cl. 242—118.7                                          3 Claims

ABSTRACT OF THE DISCLOSURE

A spool formed of substantially identical halves, each having a cylindrical drum with an abutting surface at one end and a flange at the other end, the abutting surfaces being keyed together and the flanges being so formed that the spool will not shift when co-axially positioned one on the other in stacked relation. A hub is provided for receiving an arbor which is mounted by webs extending between the hub, the barrel and its flanges, the webs also providing a driving slot.

BACKGROUND OF THE INVENTION

In the use of plastic spools the spool must be so constructed that it may be molded, that is of such a construction that it may be removed from a mold, and attempts have been made to make a lightweight spool and yet one which is strong. Interlockings have been provided between the ends of spool halves usually by some longitudinally extending spaced portions which interfit. In some cases they are substantial extensions of the end surfaces of the barrel, either the inner or outer surfaces thereof, such as exist in Patent 3,334,841 or 2,190,013 which provide a relatively complicated construction with some difficulties in molding and where the surfaces are tapered tolerances must be rather close.

SUMMARY OF THE INVENTION

The spool of this invention is formed in halves with the main surfaces such as the barrel and head of relatively thin construction reinforced by flanges, webs and ribs which combine to strengthen the thinner surfaces while making a light construction. Interlocking is had between the barrel halves through the means of flanges to present wide surfaces which abut with recesses and bosses which interfit together not only increase the abutting and contacting surfaces but also to stiffen the flanges and interlock to prevent relative rotation. The outer faces of the heads have evenly spaced projections which extend radially and are formed in groups which occupy greater arcuate space than the arcuate space between the groups, the spaces between the projections being preferably greater than the width of the projections, so that when the spools are stacked one upon the other with their axes in alignment, they cannot axially shift by reason of the ribs or projections interengaging in a plurality of different directions.

DESCRIPTION OF THE PREFERRED EMBODIMENT

Figure 1:
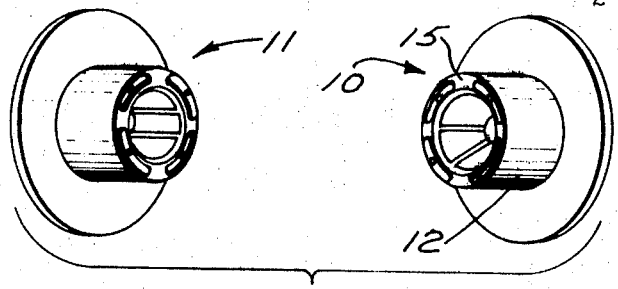
FIG. 1 is a perspective view of the two halves of the spool shown separated.
Figure 2:
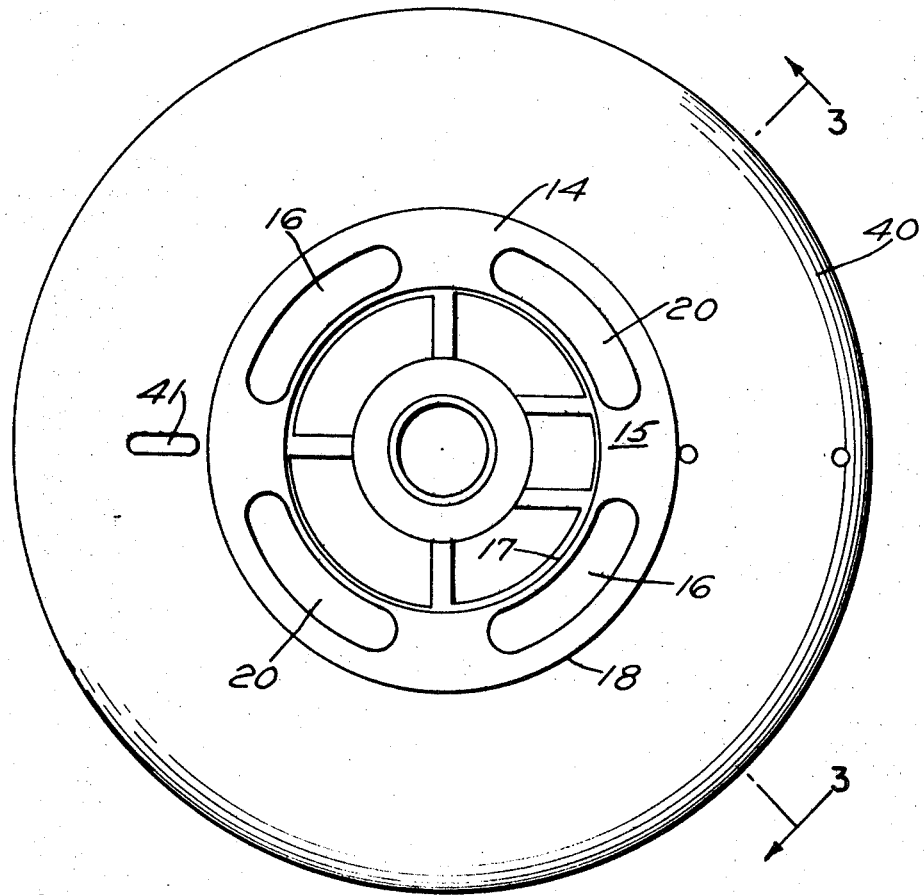
FIG. 2 is an elevation looking at the inner end of one of the halves.

The spool or bobbin consists of substantially two identical halves which are molded with a high impact, high flexural strength thermoplastic designated generally 10 and 11. These two halves being substantially identical, a description of one will suffice. The half 10 consists of a barrel 12 which is cylindrical and generally of uniform thickness (see FIG. 3). At the inner end of the barrel 12, there is an inwardly extending flange 14 which presents a broad abutting surface 15 of circular formation. The flange 14 also assist in strengthening the barrel 12 against compression. If it is desired to provide rotational orientation, recesses 16 may extend inwardly axially of this surface 15 and are illustrated as being in arcuate form and located between the inner circumference 17 and the outer circumference 18 (see FIG. 2) of this circular end abutting surface 15. As shown each of the recesses extends 60° of arc. Bosses 20 of a complementary shape to the recesses 16 may be located between the inner circumference 17 and outer circumference 18 of the abutting end surface 15 and are located at diametrically opposite locations as illustrated in FIG. 2. The arrangement is such that when the abutting surfaces 15 of two halves are brought together, the bosses 20 in one half will enter the recesses 16 in the other half, thus providing an enlarged surface contacting area securing the halves together by adhesive or welding and also provide an interlocking fit to prevent one section from rotation about its axis relative to the other section. Inasmuch as the surfaces are arcuate and located inwardly of the outer and inner circumferences of the face or abutting face, they will be completely hidden from view and the bosses will also strengthen the flange 14 on which they are formed.

Figure 6:
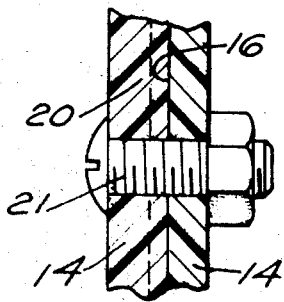
FIG. 6 shows one means of securing the two halves of the spools together.
Figure 7:
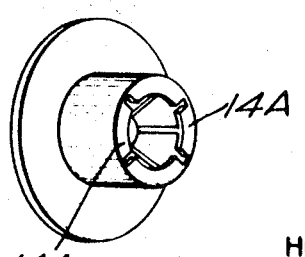
FIG. 7 shows the construction of an alternate form of spool half.
Figure 5:
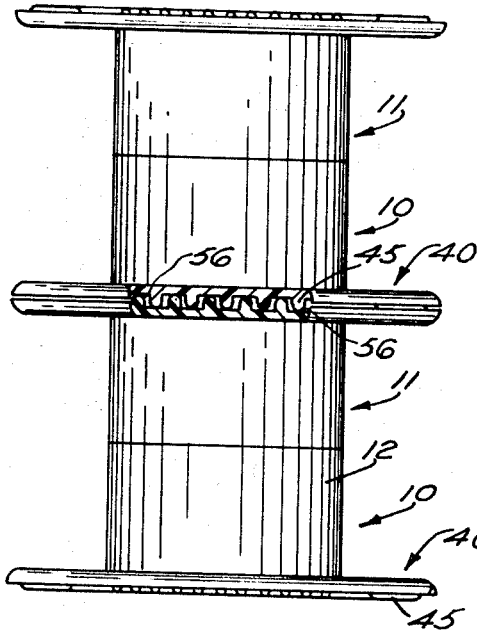
FIG. 5 is an elevation showing two spools stacked one upon the other and partly broken away to show the interfitting relation.

It is desirable to use for the reel plastic foamed core with a minimum thickness of three-sixteenths of an inch. For example, if polyethylene is used the abutting faces 15 may be secured together by heating to weld the plastic material together, by ultrasonic welding, or by cementing, screwing, riveting, stapling, or by bolting as shown in FIG. 6, the bolts 21 or fasteners, if any, being located in or near the areas through the bosses and recesses which fit together if the same are provided. Access may be had to the flanges for mechanical fastening through the end of the cylindrical barrel. It will also be apparent that in some circumstances the flanges 14 may be segments 14A interrupted to receive fastening means, for example, as shown in FIG. 7.

Figure 3:
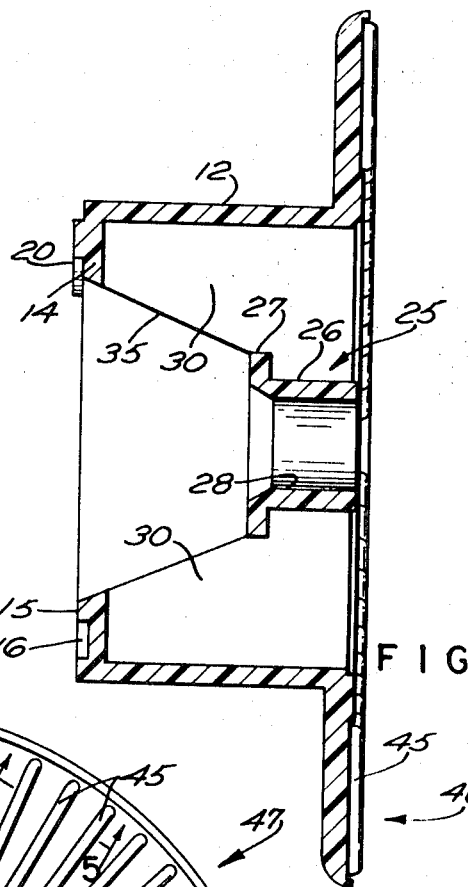
FIG. 3 is a section on substantially line 3—3 of FIG. 2.
Figure 4:
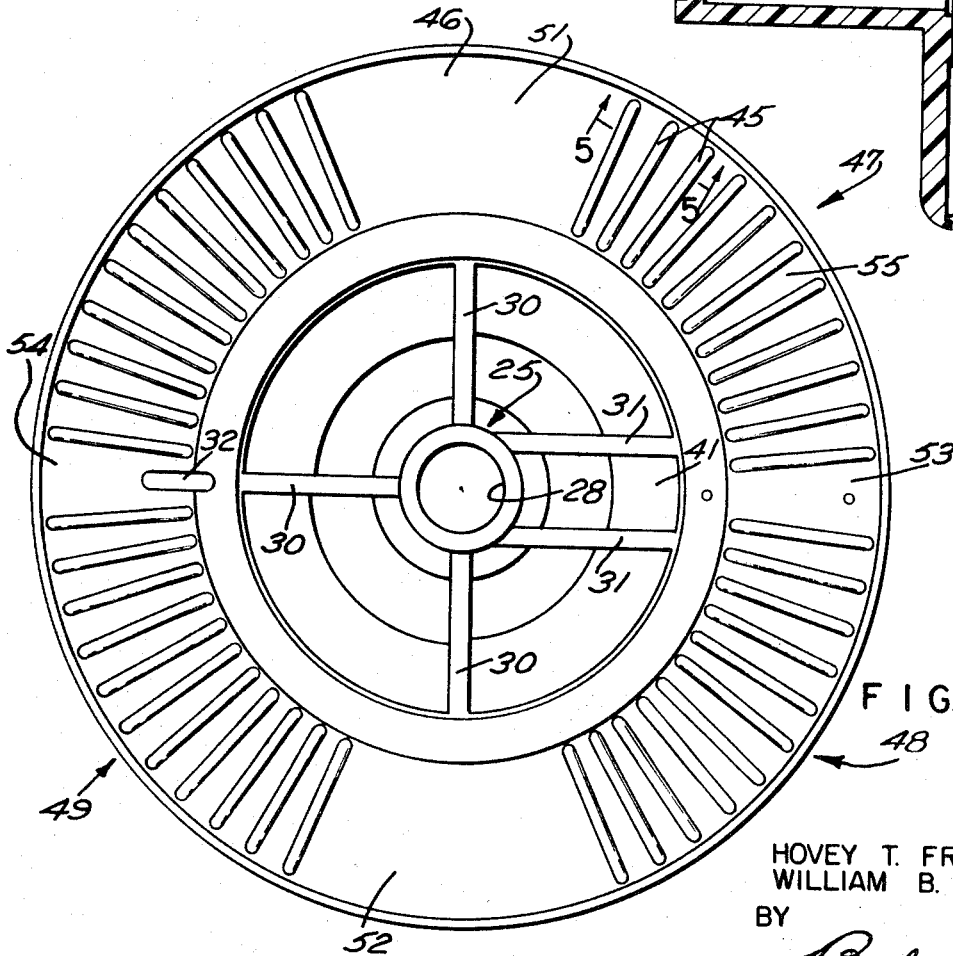
FIG. 4 is an end view of the outer face of one of the heads.

A hub 25 comprising a cylindrical portion 26 having a flange 27 and an inner cylindrical surface 28 is located within the barrel, this inner surface 28 serving as a bearing for an arbor which extends through the spool—there being a similar bearing at the other end of the spool in the other half. This hub is supported by a plurality of radially extending webs 30 which, as seen in FIG. 4, are substantially 90° apart except the webs 31 which are spaced from each other to provide a recess 32 for a driving connection to the spool. These webs extend from the inner surface of the barrel 12 to the hub 25 throughout substantially the axial extent of both the barrel and the hub. The hub is of a diameter less than the diameter of the barrel or its flanges 14 which extend inwardly, and the webs are tapered along their surface 35 from the hub to the flange 14 as seen in FIG. 3, which also provides for an easy withdrawal of the spool from the mold and also provides a maximum strengthening by means of the ribs extending between the strengthening flange 14, the barrel 12 and the hub 25 which is also flanged at 27.

A head designated generally 40 extends radially outwardly and circularly from the barrel and is provided with a viewing opening 41 (see FIG. 2 or FIG. 4) so that the amount of wire left on the spool adjacent the barrel may be seen. The heads 40 enable the spools to be stacked one upon the other coaxially since shifting of spools so stacked may occur if their heads are smooth on their outer face. To prevent such shifting, radial projections 45 are provided in the circular area 46 around the outer periphery of the head. These projections are located in groups 47, 48, 49 and 50 for example. There are spaces between the groups as at 51 and 52 and also 53 and 54, which may provide for marking or labeling. However, the space between the groups of ribs is less than the area occupied circularly by the groups so that when one head is stacked upon another head, there will always be an interfitting relation of the projections and the spaces 55 between the projections 45 to allow the projections to easily interfit one with the other and inasmuch as the projections are radial and cover a substantial distance arcuately of the head, there will be no shifting of one head on the other in any direction lateral of the axis. In order that the projections 45 may be easily interfitted one with the other the outer edges of the projections 45 are curved as at 56 so that the ribs on one head will in all cases slide between the ribs of the face of an adjacent spool and in the spaces between ribs rather than one abutting against the other.

We claim:

1. A spool for strand material comprising two substantially identical spool halves each of which is molded in an integral member of plastic material, each of said halves having a cylindrical barrel with an annular head of substantial width presenting an abutting surface perpendicular to the barrel axis and having the inner edge of said annular head substantially contiguous with the inner surface of said barrel, each of said halves having an annular flange extending inwardly and positioned perpendicular to the inner end of said barrel, means on said flanges to hold said halves in abutting relation, a cylindrical hub coaxial with said barrel and of a diameter less than the inner edge diameter of said flange, a plurality of radial webs extending between said hub and barrel supporting said hub in position, said webs extending from a plane substantially flush with the outer end of said barrel to said flange and said web having a surface extending from the hub to the flange and being tapered radially outwardly.

2. A spool as recited in claim 1 further comprising spaced groups of radially extending projections on the outer faces of said heads, said groups occupying a larger amount of arcuate surface than the spaces between said groups, said projections being spaced a greater distance than their width so that the projections on one head may fit between the projections on another head when the spools are stacked in end to end relation to prevent axial shifting of the stacked spools.

3. A spool as recited in claim 2 wherein said projections have an arcuate outward edge to assist in guiding the projection on one face into the spaces between projections on another face.

References Cited

UNITED STATES PATENTS

| | | | |
|---|---|---|---|
| 1,462,166 | 7/1923 | Chapman | 242—118.6X |
| 2,190,013 | 2/1940 | Byers | 242—118.4 |
| 2,208,456 | 7/1940 | Howsam | 242—118.6 |
| 2,344,665 | 3/1944 | Adams | 242—118.7 |
| 2,780,420 | 2/1957 | Mitnick | 242—118.7X |
| 3,176,932 | 4/1965 | Kovaleski | 242—118.8 |

FOREIGN PATENTS

| | | | |
|---|---|---|---|
| 837,152 | 6/1960 | Great Britain | 242—118.41 |

GEORGE F. MAUTZ, Primary Examiner

U.S. Cl. X.R.

242—118.41